(12) United States Patent
Niblock

(10) Patent No.: US 8,590,390 B1
(45) Date of Patent: Nov. 26, 2013

(54) METHODS OF FABRICATING A MINIATURE STRAIN SENSING APPARATUS

(75) Inventor: Trevor Graham Edward Niblock, Sunnyvale, CA (US)

(73) Assignee: Analatom Incorporated, Sunnyvale, CA (US)

( * ) Notice: Subject to any disclaimer, the term of this patent is extended or adjusted under 35 U.S.C. 154(b) by 13 days.

(21) Appl. No.: 13/075,195

(22) Filed: Mar. 30, 2011

Related U.S. Application Data

(60) Division of application No. 12/045,018, filed on Mar. 9, 2008, now Pat. No. 7,992,447, which is a continuation of application No. 11/048,462, filed on Jan. 31, 2005, now Pat. No. 7,340,960.

(60) Provisional application No. 60/540,843, filed on Jan. 30, 2004.

(51) Int. Cl.
*G01B 7/16* (2006.01)

(52) U.S. Cl.
USPC .............................................. 73/777; 73/760

(58) Field of Classification Search
USPC .................................................... 73/760, 777
See application file for complete search history.

(56) References Cited

U.S. PATENT DOCUMENTS

| | | | |
|---|---|---|---|
| 4,311,980 A | 1/1982 | Prudenziati | |
| 4,771,638 A * | 9/1988 | Sugiyama et al. | 73/721 |
| 4,799,381 A | 1/1989 | Tromp | |
| 5,259,248 A | 11/1993 | Ugai et al. | |
| 5,289,721 A | 3/1994 | Tanizawa et al. | |
| 5,402,684 A | 4/1995 | Engeler et al. | |
| 5,646,339 A | 7/1997 | Bayer et al. | |
| 5,649,934 A | 7/1997 | Smeltzer et al. | |
| 5,756,899 A | 5/1998 | Ugai et al. | |
| 5,844,287 A | 12/1998 | Hassan et al. | |
| 5,978,693 A | 11/1999 | Hamilton et al. | |
| 6,053,530 A | 4/2000 | Faigle | |
| 6,272,371 B1 | 8/2001 | Shlomo | |
| 6,347,555 B1 | 2/2002 | Namerikawa et al. | |
| 6,444,487 B1 * | 9/2002 | Boggs et al. | 438/48 |
| 6,479,920 B1 | 11/2002 | Lal et al. | |
| 6,619,135 B2 | 9/2003 | Liebemann et al. | |
| 6,769,313 B2 | 8/2004 | Weiss | |
| 6,928,879 B2 * | 8/2005 | Partridge et al. | 73/754 |
| 7,017,662 B2 | 3/2006 | Schultz et al. | |
| 7,181,977 B2 | 2/2007 | Thompson et al. | |
| 7,218,188 B2 | 5/2007 | Ma et al. | |
| 7,311,009 B2 | 12/2007 | Kotovsky | |
| 7,340,960 B2 | 3/2008 | Niblock | |
| 7,966,898 B2 * | 6/2011 | Roukes et al. | 73/862.627 |
| 2001/0025531 A1 * | 10/2001 | Leung | 73/708 |
| 2002/0121843 A1 | 9/2002 | Takeuchi et al. | |
| 2003/0051561 A1 | 3/2003 | Weiss | |
| 2004/0085657 A1 | 5/2004 | Gullapalli et al. | |

* cited by examiner

*Primary Examiner* — Max Noori
(74) *Attorney, Agent, or Firm* — DLA Piper LLP (US)

(57) ABSTRACT

A strain sensing apparatus including a deformable substrate is presented. The deformable substrate is configured to detect a strain of the body that can be coupled to the deformable substrate. Sometimes, the deformable substrate is a flexible substrate having an upper surface and an opposite lower surface. The lower can be coupled to the body. There are sensing elements fabricated within the flexible substrate and proximate to the upper surface to detect properties of the body. The strain sensing apparatus is able to detect different strain modes, such as whether the strain is the result of bending of a body or a uniaxial elongation. Furthermore, the apparatus is small and less fragile than most conventional sensors, making it easy to use.

19 Claims, 12 Drawing Sheets

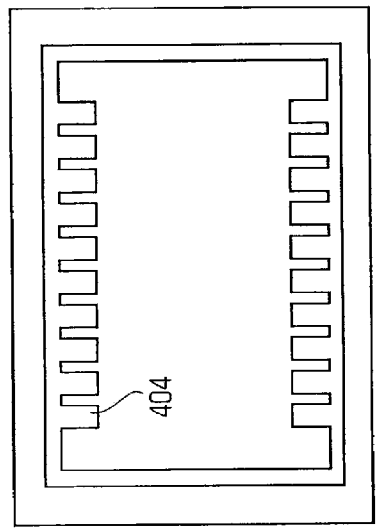
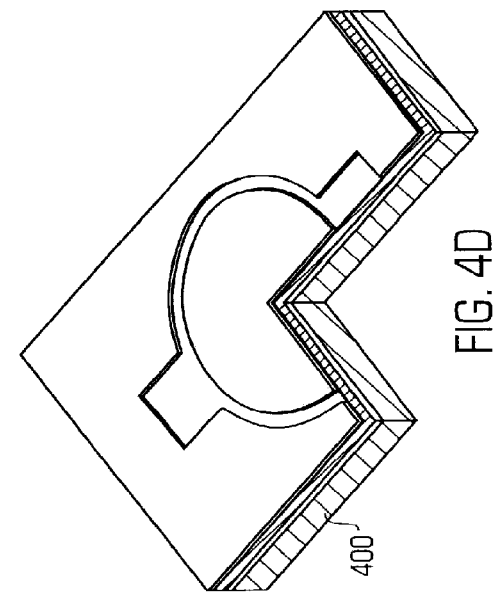
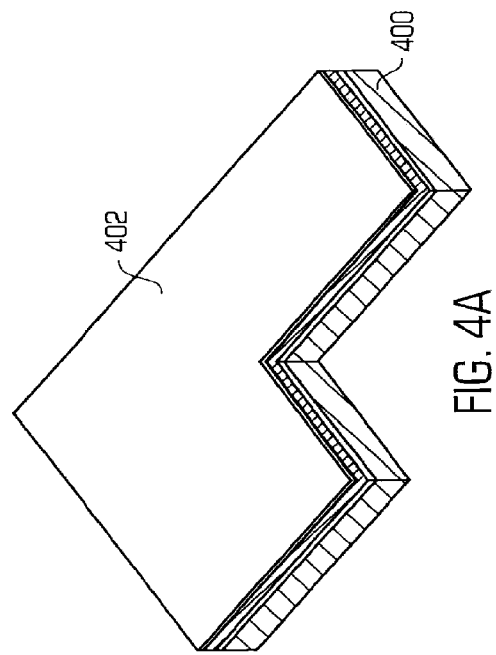
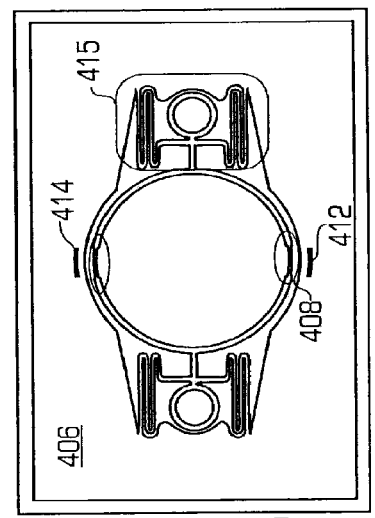
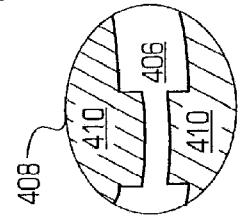

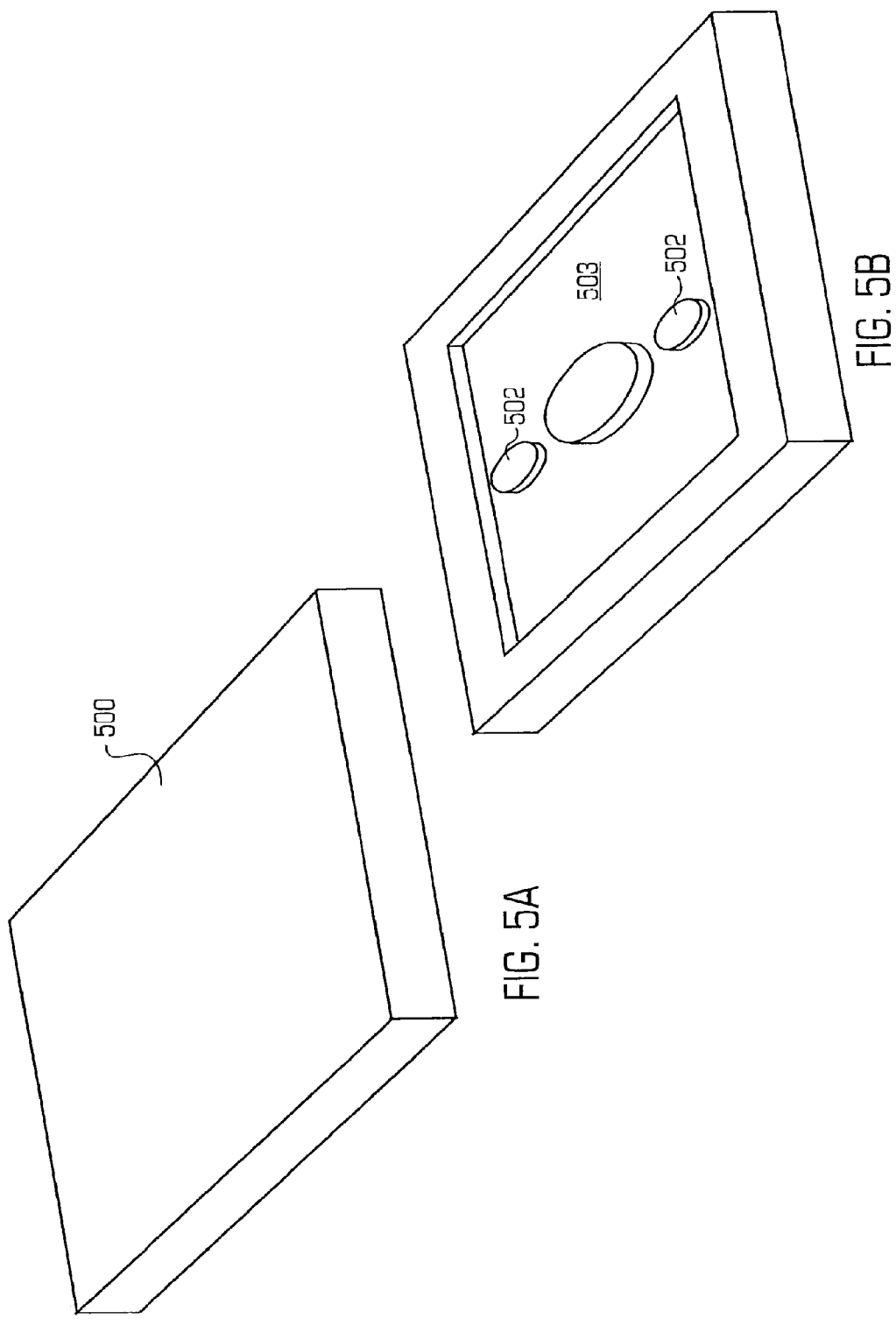

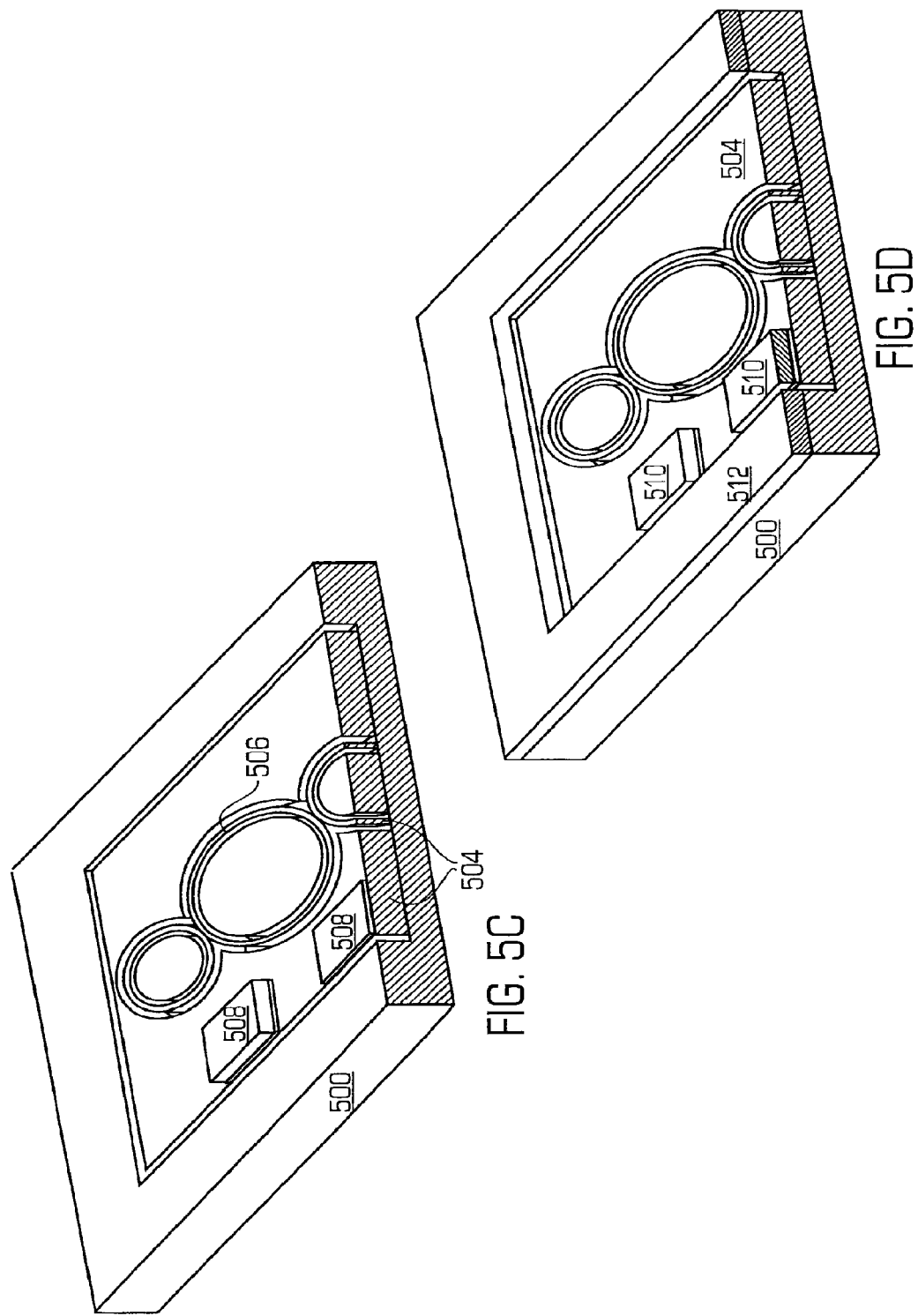

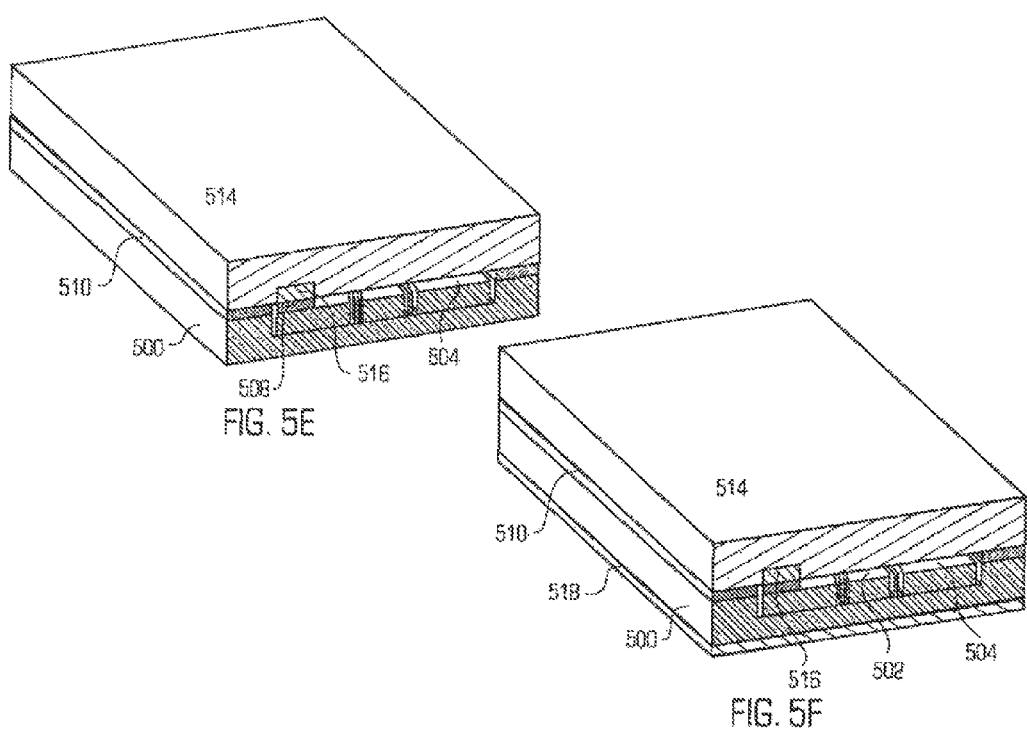

METHODS OF FABRICATING A MINIATURE STRAIN SENSING APPARATUS

CROSS REFERENCE TO RELATED APPLICATIONS

This is a division of application Ser. No. 12/045,018, filed Mar. 9, 2008, publication No. US2008/0245156A1, now U.S. Pat. No. 7,992,447, which is a continuation of application Ser. No. 11/048,462, filed Jan. 31, 2005, publication No. US2005/0229713A1, now U.S. Pat. No. 7,340,960, and claims the benefit of U.S. Provisional Application No. 60/540,843, filed Jan. 30, 2004, all of which are incorporated herein by reference in entirety.

BACKGROUND

1. Field

This invention relates to sensors. More specifically, this invention relates to microstructure sensors.

2. Description of Related Information

Efforts in sensor technology have often been directed toward reducing the size of sensors and sensing elements. Smaller sensors are desirable for a number of reasons. For example, smaller sensors are more easily placed within small spaces, and are often lighter and easier to handle. Recent efforts have focused on fabricating sensors according to micromachining and micro-electro-mechanical-systems (MEMS) methods, to create low-profile and/or "low-dimensional" micro-sensors that are fabricated on substrates such as silicon wafers. These MEMS sensors can be made quite small, relative to conventional sensors.

Such sensors can be utilized in a number of different applications. One such application in which MEMS sensors are desirable is strain sensors. The use of sensors to measure strain, i.e. elongation per unit length, is often helpful in fields such as failure analysis and the design of structures. In order to fit strain sensors into small areas within a structure or body, and in order to ensure that the sensors themselves do not contribute significantly to the dynamics of a structure, it is often beneficial to make these sensors as low-dimensional as possible.

Such micro-sensors are not without drawbacks, however. For example, they are often fragile and difficult to handle. In addition, micro-sensors often are limited in their functionality. For example, low-dimensional strain sensor assemblies often lack the capability to detect multiple different strain modes. That is, current MEMS strain sensor assemblies can detect a strain of the body upon which they are placed, but they cannot by themselves determine whether that strain is the result of a bending of the body, or a uniaxial elongation. Accordingly, continuing efforts exist to improve MEMS sensors and their associated systems, especially in terms of developing a micro-sensor that can differentiate between multiple different strain modes.

SUMMARY

The invention can be implemented in numerous ways, including as a method, system, and device. Various embodiments of the invention are discussed below.

As a strain sensing apparatus, one embodiment of the invention comprises a deformable substrate configured to be coupled to a body, and a strain sensing element formed from the deformable substrate and configured to detect a strain of the body.

As a strain sensing apparatus, another embodiment of the invention comprises a flexible substrate having an upper surface and an opposite lower surface, the lower surface configured to be coupled to a body. A plurality of sensing elements are fabricated within the flexible substrate and proximate to the upper surface, the sensing elements configured to detect properties of the body when the lower surface of the flexible substrate is coupled to the body.

As a method of fabricating a strain sensing apparatus, another embodiment of the invention comprises receiving a substrate having an upper surface and a lower surface, and fabricating a plurality of strain sensing elements upon the substrate and proximate to the upper surface. Material is etched from the upper surface of the substrate so as to fabricate a sensor support structure configured to support the plurality of strain sensors thereon. Material is then removed from the lower surface of the substrate so as to further expose the sensor support structure.

Other aspects and advantages of the invention will become apparent from the following detailed description taken in conjunction with the accompanying drawings which illustrate, by way of example, the principles of the invention.

BRIEF DESCRIPTION OF THE DRAWINGS

For a better understanding of the invention, reference should be made to the following detailed description taken in conjunction with the accompanying drawings, in which:

FIGS. 5A-5F further illustrate process steps in mounting sensors onto flexible tape.

Like reference numerals refer to corresponding parts throughout the drawings.

DETAILED DESCRIPTION OF EXEMPLARY IMPLEMENTATIONS

In one sense, the invention relates to a low-dimensional strain sensor that can detect multiple modes of deformation. The configuration and operation of this strain sensor is shown conceptually in FIGS. 1A-1C. Here, MEMS techniques are employed to fabricate a number of piezoresistors 100 directly into a toroidal, or generally ring-shaped, substrate 102. By employing MEMS techniques, the toroidal substrate 102 can be made small and flat, yielding a compact and lightweight sensor.

In addition, the use of MEMS fabrication techniques allows for the fabrication of low-profile substrates 102 that have piezoresistors 100 that are fabricated directly into or upon the upper surface 106 of the substrate 102 (as can be seen in the side view of FIG. 1A), without protruding upward from the upper surface 106. In this manner, the piezoresistors 100 are located off the substrate's 102 neutral axis of bending, allowing the piezoresistors 100 to differentiate between multiple deformation modes, without adding to the total height or thickness of the sensor.

Figure 1A:
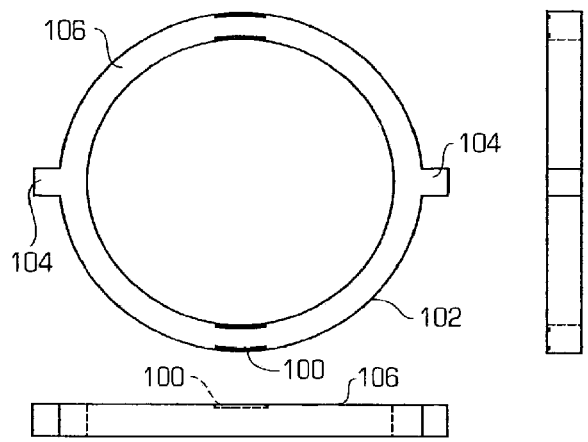
FIGS. 1A-1C illustrate a strain sensing apparatus employing piezoresistive strain sensing elements in accordance with an embodiment of the invention, and its behavior in multiple strain modes.
Figure 1B:
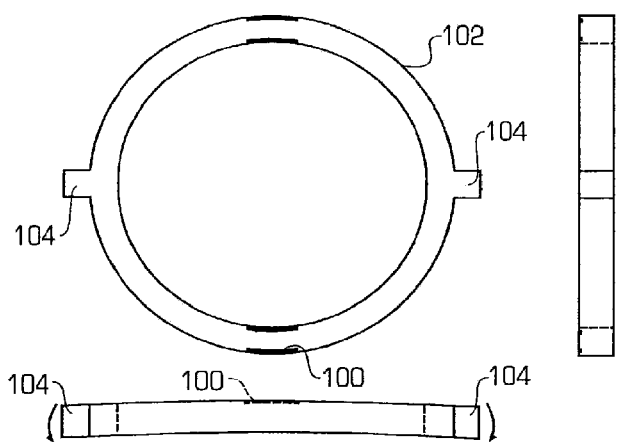
Figure 1C:
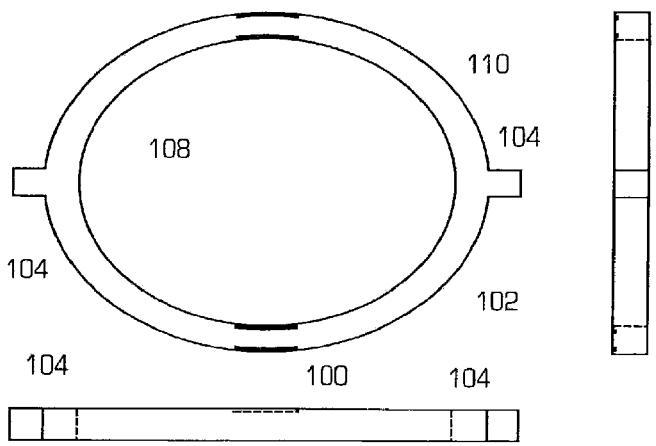

The detection of multiple deformation modes is seen conceptually in FIGS. 1B-1C. In FIG. 1B, the substrate 102 and piezoresistors 100 are subject to pure bending strain by bending moments applied at the load points 104. One of ordinary skill will observe that, in pure bending, all four piezoresistors 100 undergo an equal deformation. Furthermore, because the piezoresistors 100 are all located off the neutral axis of the substrate 102, this deformation is a finite elongation. Piezoresistors 100 react as standard piezoresistor elements, increasing their resistance as they are elongated, which can be detected by measuring a difference in voltage across each piezoresistor 100. In FIG. 1C, the substrate 102 and piezoresistors 100 are subject to uniaxial strain along the axis connecting the load points 104. One of ordinary skill will observe that, under uniaxial strain, the substrate 102 stretches and "flattens," placing the two piezoresistors 100 along the inner circumference 108 in tension (thus elongating them), and placing the two piezoresistors 100 along the outer circumference 110 in compression. Accordingly, the two piezoresistors 100 along the inner circumference 108 will increase their resistance, and the two along the outer circumference 110 will decrease their resistance. As this behavior is different from the bending example of FIG. 1B, it can be seen that miniature sensor assemblies configured as in FIG. 1A are capable of detecting multiple modes of deformation while remaining small, compact, and low-profile.

Figure 2A:
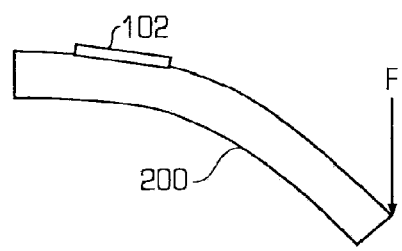
FIGS. 2A-2D illustrate the use of the strain sensing apparatus of FIGS. 1A-1C to detect both bending and stretching during structural failure.
Figure 2B:
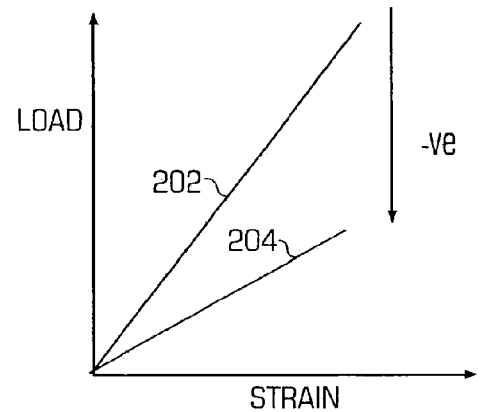
Figure 2C:
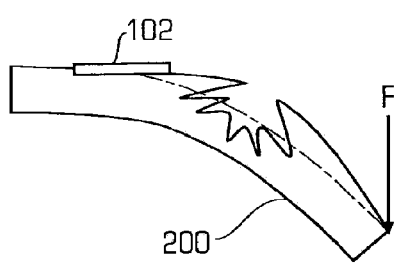
Figure 2D:
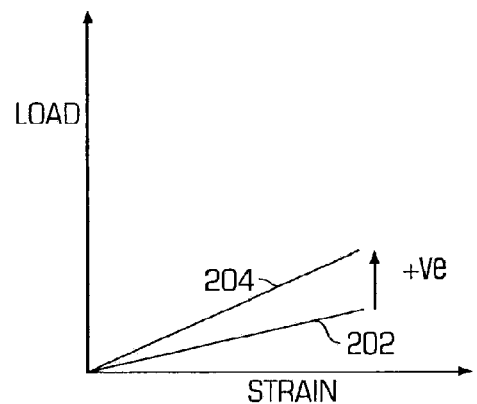

The ability to detect and differentiate between multiple modes of deformation is advantageous in many different applications. One such application is the detection of structural failure. FIGS. 2A-2D illustrate the substrate 102 when used to detect the strain undergone by a cantilever beam 200 deflected by a force F. As discussed above, the configuration of the substrate 102 and location of the piezoresistors 100 allow one to distinguish between bending strain and axial strain. As the total strain is simply a linear superposition of both detected bending and axial strain, each type of strain can be isolated and charted as in FIGS. 2B and 2D. Accordingly, before failure, the force F imparts a larger bending strain upon the beam 200 and a smaller axial strain. Thus, the isolated bending strain line 202 increases faster than the axial strain line 204, as seen in FIG. 2B. However, upon failure such as the "rupture-type" failure shown in FIG. 2C, much of the bending strain is ameliorated, while much of the axial deformation remains. Thus, the bending strain line 202 and axial strain line 204 invert their positions relative to one another, as shown in FIG. 2D. One indicator of failure, then, is a sudden inversion of the relative positions of these two strain graphs 202, 204. In this manner, the ability to differentiate between strain modes is helpful in monitoring for structural failure.

While the above described example illustrates the use of piezoresistive strain sensing elements, it should be noted that the invention is not limited in this regard. Rather, the invention more generally encompasses the microfabrication of any type of sensing element. One of skill will recognize that the invention can be applied to many different contexts, and not just in strain detection. For example, substrate 102 can be used to support low-dimensional temperature or pressure sensing elements, in addition to strain sensing elements. Also, the invention can be applied to the fabrication of other types of strain sensing elements besides piezoresistors.

Figure 3:
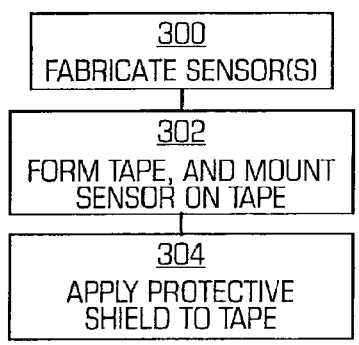
FIG. 3 illustrates process steps in fabricating a sensor apparatus in accordance with embodiments of the invention.

The fabrication and packaging of sensors according to one embodiment of the invention is illustrated in FIG. 3, which illustrates, at a high level, the process steps involved. First, sensing elements are fabricated according to MEMS or micromachining techniques described herein (step 300). For ease of use, a tape is formed and the sensors are mounted thereon (step 302). It is often advantageous to fabricate the tape as a flexible circuit, so that the sensor and its accompanying electronics can all be mounted on a single compact and easy-to-handle package. Once the sensor is mounted upon this tape, a protective shield can be applied to protect the sensor and tape (step 304). The end result is a complete sensor package that is robust yet compact. It should be noted that the invention does not necessarily require all three of these steps to be carried out together. Rather, such steps are an illustration of one embodiment.

Figure 4F:
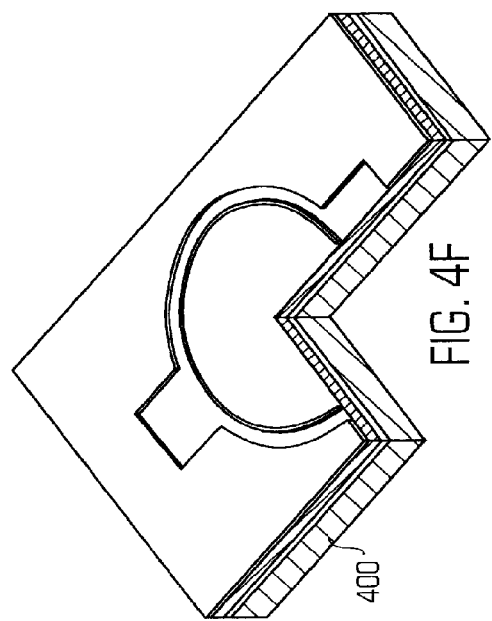
FIGS. 4A-4Q further illustrate process steps in fabricating micro-sensors in accordance with embodiments of the invention.
Figure 4H:
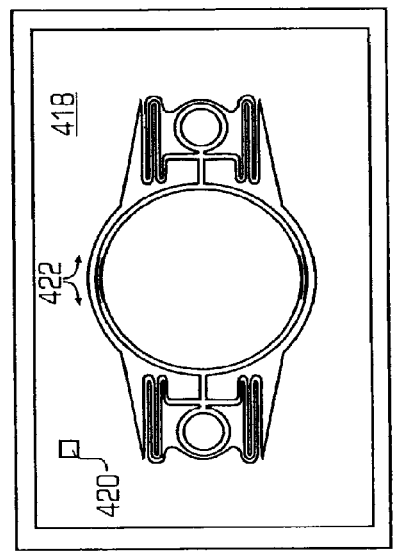
Figure 4E:
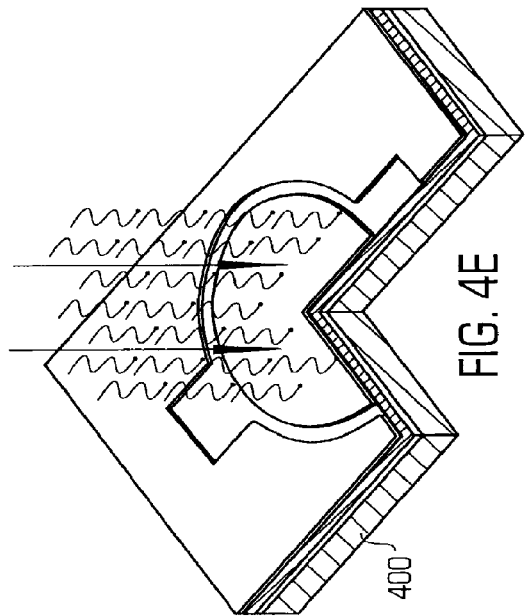
Figure 4G:
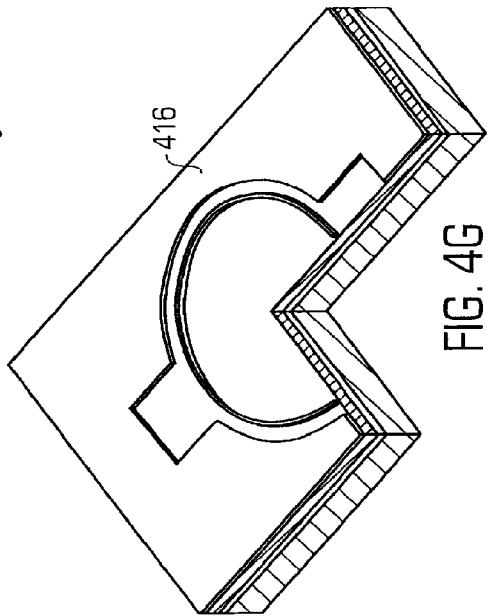
Figure 4J:
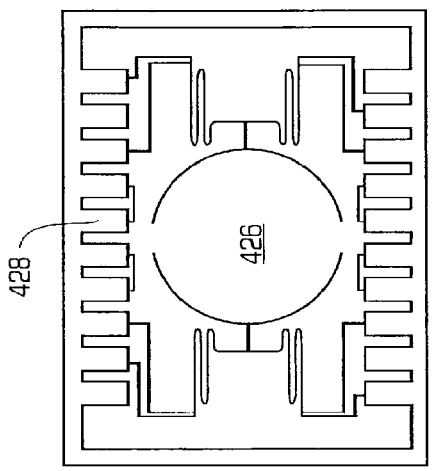
Figure 4L:
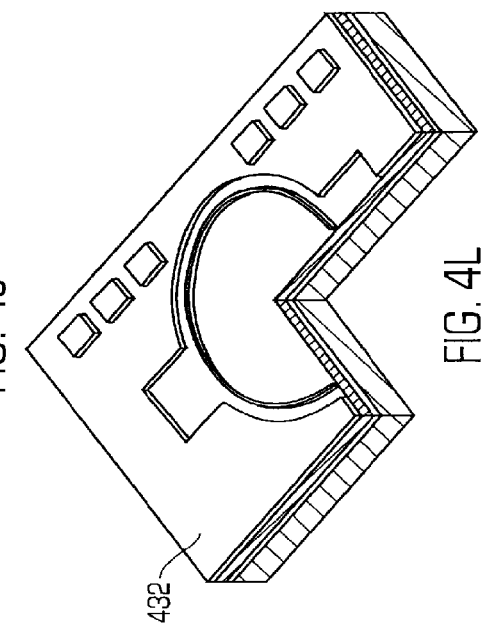
Figure 4I:
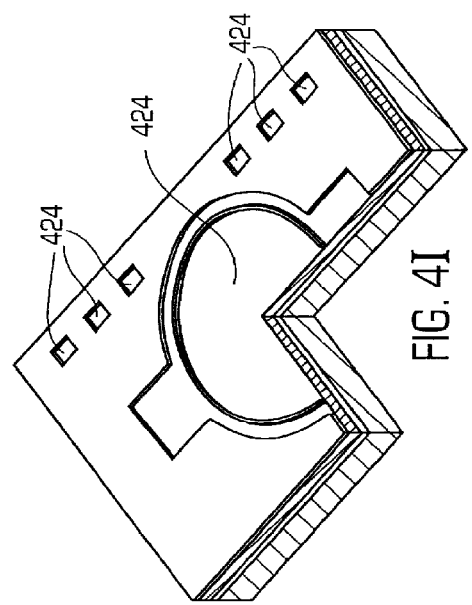
Figure 4K:
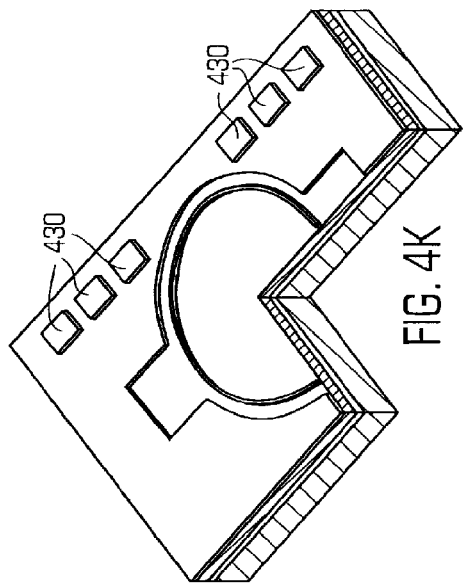
Figure 4N:
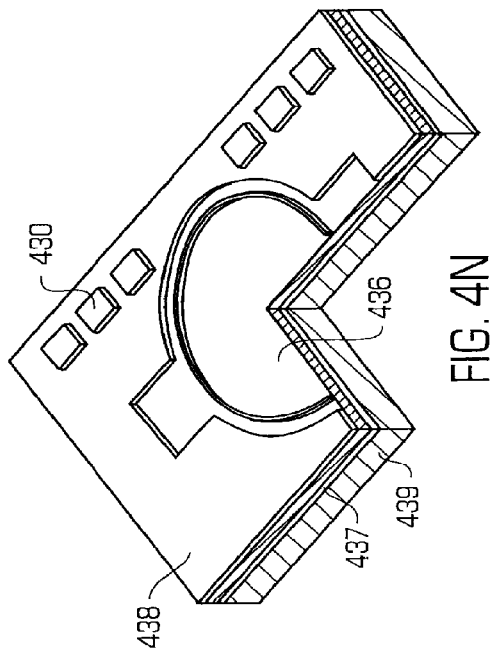
Figure 4O:
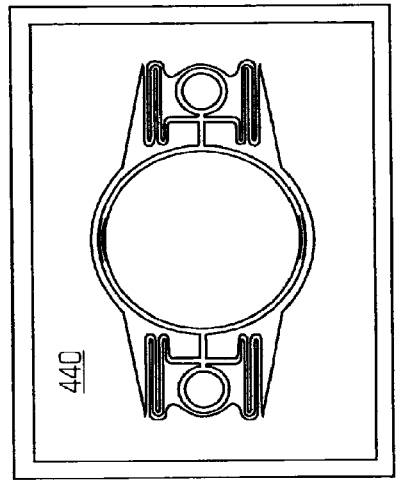
Figure 4M:
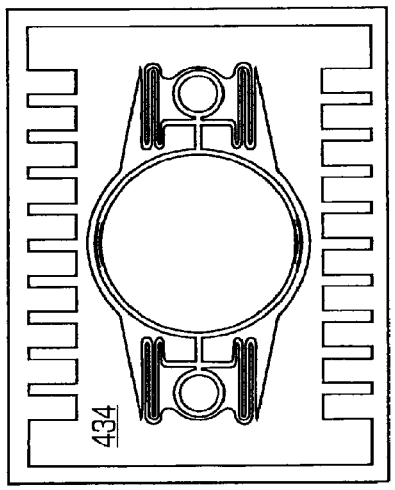
Figure 4P:
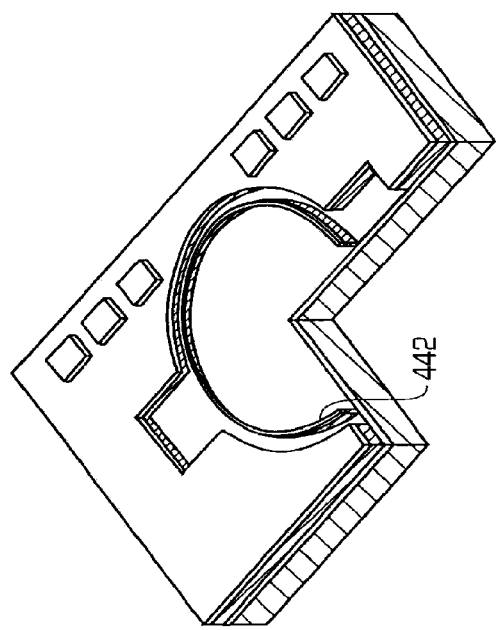
Figure 4Q:
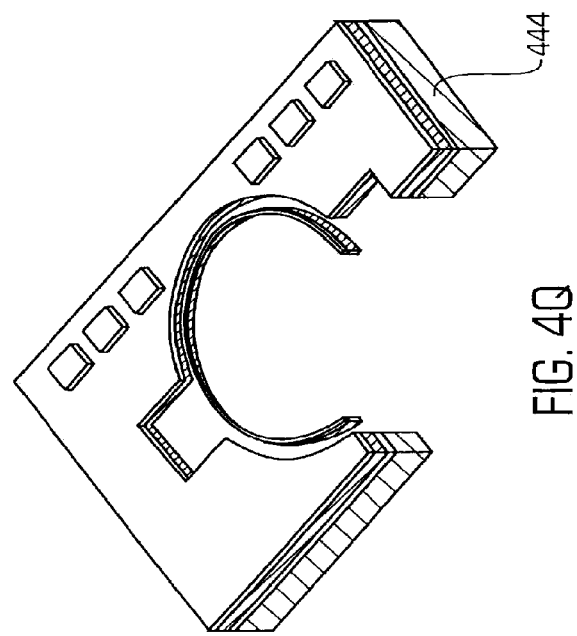

FIGS. 4A-4Q illustrate further details of step 300, or the fabrication of miniature sensors in accordance with embodiments of the invention. For ease of illustration, FIGS. 4A-4Q illustrate the fabrication of a piezoresistive micro-sensor assembly similar to that shown in FIGS. 1A-1C. That is, a ringlike or toroidal structure is described, into which sensing elements are fabricated. Other associated support structure is also fabricated, but such support structures often only provide ancillary support for the sensing elements themselves, and as a result some are not shown for simplicity. Such support structures can be readily fabricated with the methods below, as one of skill will realize. It should be reiterated, however, that the invention contemplates other types of sensing elements and assembly configurations. With reference to FIG. 4A, the sensor fabrication process is begun with a deformable or flexible substrate such as a bulk silicon wafer 400. Current standard silicon wafers 400 are often on the order of 500 micrometers in thickness, although any such wafer can be used. The wafer 400 is cleaned to remove surface deposits, and an oxide layer 402 is grown using a standard wet oxide process. For example, a 1000° C. wet oxide process can be employed to deposit a 0.33 micrometer-thick oxide layer 402.

Masking and etching processes can now be employed. With reference to FIG. 4B, a shallow depression pattern is to be etched in the substrate 400 to be used in the aligning of electrical contact pads for the sensor's sensing elements. A photolithographic mask 404 is applied to the oxide layer 402, and a shallow potassium hydroxide (KOH) etch process is employed to etch a shallow patterned depression in the oxide layer 402. The mask 404 is then removed and the substrate 404 is decontaminated of potassium. A 0.5 micrometer-thick oxide layer is then grown atop the existing (patterned) oxide layer 402, covering the aligning areas that were just etched. The oxide layer 402 thus has patterned areas upon it.

With reference to FIG. 4C, another photolithographic mask 406 is applied to the oxide layer 402, this one patterned so as to expose the areas upon which the sensing elements will be fabricated. As shown in the magnified portion 408 of FIG. 4C, the mask 406 specifically covers areas upon which conductive traces are to be drawn, and exposes areas corresponding to the general shape of the sensing elements and support structure, as well as the sensing elements to be fabricated. Thus, the detailed area 408 is configured in an arcuate shape as shown, with indented areas 410 where piezoresistors are to be fabricated. Note that windows 412 are also patterned to expose areas upon which one or more (in this case, two) reference piezoresistors are to be fabricated. Note also that this pattern of indented areas 410 and windows 412 for reference piezoresistors is repeated at the opposite position 414 along the ring-like structure. The reference piezoresistors and their operation are described further below. In general, the reference piezoresistors can be fabricated as with the piezoresistors upon the ringlike structure. While they are not placed under the same stresses/strains (or other properties) as the piezoresistors upon the ringlike structure, they often undergo the same temperature fluctuations as the piezoresistors upon the ringlike structure. As such, they can be employed to compensate for temperature fluctuations, or fluctuations in other properties, in the piezoresistors upon the ringlike structure. The substrate 400 is then exposed to a wet etch process such as a buffered oxide etch (BOE) sufficient to etch away the unmasked portions of the oxide layer 402. This etch effectively opens up, or exposes, the areas of the substrate 400 upon which piezoresistors are to be created. Finally, note that as photolithographic masks 406 can be configured in a variety of shapes, the piezoresistors and their structure can take on a variety of shapes besides the arcuate shape shown. FIG. 4D illustrates the substrate 400 after these processes, in which contoured areas have been created and portions have been exposed for the forming of piezoresistors. Note again that detailed areas such as that corresponding to the region 415 of the mask 406 are not shown in FIG. 4D, for simplicity.

FIG. 4E illustrates the implanting of piezoresistors. The exact process used here varies according to the type of sensing element desired. For piezoresistors, boron ions are irradiated upon the exposed portions of the substrate 400 so as to dope these portions of the substrate 400 with p-type boron ions. The result of such doping is to impart the exposed portions of the substrate 400 with a piezoresistive function. In this manner, piezoresistors are fabricated within the substrate 400 itself, meaning that each piezoresistor does not occupy any more space than the substrate 400 itself, and does not protrude from the substrate 400. In one embodiment, piezoresistors are fabricated by irradiating with boron ions at an energy of 32 KeV and dose of $1 \times 10^{15}$ cm$^{-2}$, at room temperature, at an angle of 7°, and current of less than 100 µA.

The substrate 400 is then annealed (FIG. 4F) to anneal the resist implant so as to facilitate satisfactory growth of gate oxide, and a layer of silicate glass (SiO2) 416 is deposited over the entire upper surface of the substrate 400 so as to effectively cover the substrate 400, piezoresistors, and oxide layer 402 with an electrically insulating layer (FIG. 4G). It is often beneficial to perform the glass deposition step immediately subsequent to the annealing step, so as to avoid reentrant step profiles that may impair later metal coverage.

As shown in FIG. 4H, another mask 418 is then applied, which is patterned to expose specific areas, such as areas 420, 422, where the insulating layer of glass is to be etched away. More specifically, the mask 418 exposes those areas where it is desirable to establish electrical contact between the piezoresistor structure and other components. Many such areas 420, 422 can be fabricated besides the ones shown. The substrate 400 is then etched using, for example, a reactive ion etch (RIE), or wet etch process such as a hydrofluoric acid etch, to etch out contact windows where the substrate 400 is exposed (FIG. 4I).

A layer of aluminum (not currently shown) is then sputtered upon the entire surface of the substrate 400, where it contacts the substrate 400 at the contact windows 424. Specifically, the fabricated piezoresistors are coated so as to begin the formation of electrical leads extending from them. With reference to FIG. 4J, another mask 426 is applied to the substrate 400, this one patterned so as to expose the leads that are to electrically connect each piezoresistor to the appropriate contact pad 428. The aluminum layer is then exposed to a dry etch process such as a plasma etch, to create the traces outlined in FIG. 4J. The photoresist mask 426 is then stripped off (FIG. 4K, in which traces are not shown for simplicity), and the contact pads 430 are resistance-checked to determine continuity. A low temperature oxide (LTO) layer 432 such as another glass layer can optionally be deposited to protect the aluminum from oxidation (FIG. 4L).

Another photoresist pattern 434 is then applied, as shown in FIG. 4M. With reference to FIG. 4N, this mask 434 is patterned to open up the electrical contact pads 430, and to expose other areas 436 for deep RIE so as to form the various support structures that support the piezoresistors. The outline or profile of the mask 434 thus generally illustrates the shape of the piezoresistors and their support structure in this embodiment. Once the contact pads 430 are etched clean of their LTO layer 432 and RIE has been performed on the appropriate areas 436, the upper surface 438 is affixed to a tape so as to support the substrate 400 while the backside is ground. This grinding removes bulk silicon to reduce the total thickness of the substrate to a thickness of less than 200 micrometers, and possibly less than 100 micrometers, depending on the specific application.

As the tape is present solely to support the substrate 400 during backgrinding, it is no longer necessary and is removed/dissolved. The backside of the substrate 400 is then affixed to a thicker support wafer 439, which can be any standard silicon wafer thick enough to support the thinned substrate 400, utilizing a photoresist layer 437 as an adhesive. In FIG. 4O, a final mask 440 is then affixed to the upper surface 438, this mask 440 patterned to allow for the deep etching of the support structure (i.e., the toroidal ring, etc.) that supports the sensing elements. Here, a deep RIE process is utilized again, to etch all the way down to the underlying photoresist 437 affixed to the thicker support wafer 439. FIG. 4P illustrates the resulting etched toroidal structure 442 (piezoresistors and aluminum leads not shown, for simplicity) after etching by deep RIE. The thick support wafer 439 and photoresist 437 are then removed (FIG. 4Q) by dissolving the photoresist 437, leaving a low-profile strain sensing apparatus 444.

FIGS. 5A-5F illustrate further details of step 302, in which the completed sensing elements and their support structure are mounted on a flexible tape such as a known flexible circuit, for ease of handling. With reference to FIGS. 5A-5B, a flexible tape 500 is patterned (using known cutting processes) to form support points 502 where the sensor apparatus is to be mounted. For a strain sensor application, these support points 502 are the vehicle by which loads are transferred from a body to the toroid 506, which is the structure described above that has the piezoresistors fabricated thereupon, but which is not shown to scale. The sensing apparatus 444 is then placed upon the support points 502, i.e., within the depression 503, (FIG. 5C), perhaps by first suspending the apparatus 504 (shown in simplified form) in a liquid for support and to prevent breaking of the fragile apparatus 504. The contact pads 508 then have a conductive adhesive 510 applied to them, such as a known z-axis adhesive that is conductive only in the z-direction. An insulating layer 512 is also applied to seal the edges of the tape 500. An upper tape layer 514 is next applied to sandwich the sensor apparatus 504 within (FIG. 5E). This upper tape layer 514 also contains electrical traces 516 positioned to contact the conductive adhesive 510. By positioning the electrical traces 516 correctly above the correct pads 508, the piezoresistors can be connected appropriately to power supplies and controllers. In addition, an adhesive layer 518 can be applied to the tape 500 for affixing the tape 500 to a body (FIG. 5F), so that its strain will be transmitted to the sensor apparatus 504 via the support points 502.

Figure 6:
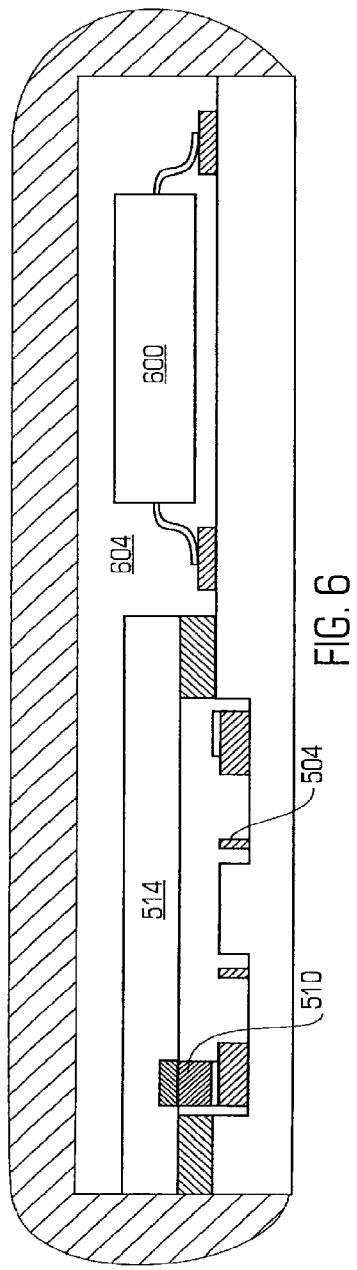
FIG. 6 illustrates the application of a protective shield to a mounted sensor.

It is worth reiterating that the flexible tape 500 can be a known flexible circuit. Consequently, other components besides the sensor apparatus 504 can be placed on the tape 500. More specifically, the tape 500 can support and electrically interconnect other electrical components used in sending signals to and from the sensor apparatus 504. Furthermore, the tape 500 can support rigid enclosures designed to protect the delicate sensor. FIG. 6 illustrates an embodiment in which a flexible tape 500 configured for the mounting of additional electronic components, as well as a protective shield for protecting the sensor and electronics. In this embodiment, the tape 500 is wide enough to support the sensor structure 504 and upper layer 514, as well as other structures such as electronic component 600, which can be any electronic component employed in connection with the sensor structure 504, but is shown as an integrated circuit package. A rigid enclosure 602 surrounds and protects the sensor structure 504 and electronic component 600, as well as any other structures supported on the tape 500, such as conductive traces. The space 604 between the enclosure 602 and the other structures can be left empty, or it can be filled with a compliant electrically insulative material to prevent contact between the enclosure 602 and other structures when the tape 500 is deformed.

Figure 7A:
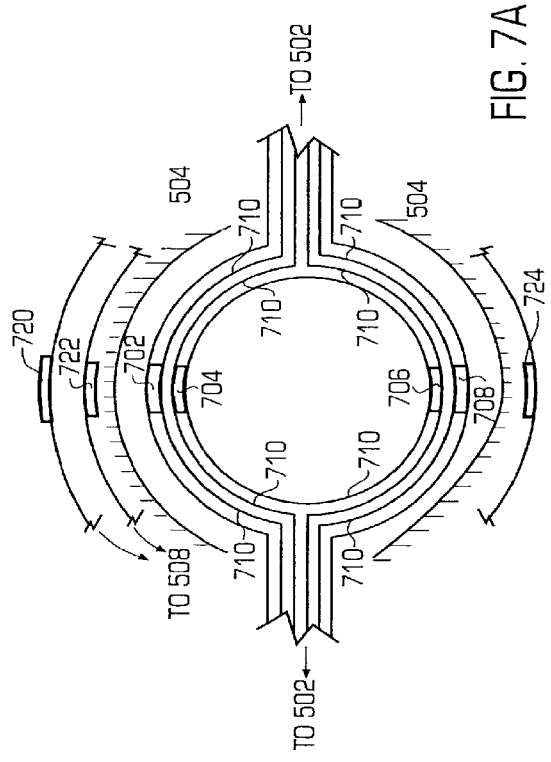
FIGS. 7A-7B illustrate a sensor configuration and corresponding electrical circuit for use in analyzing signals from a sensor apparatus respectively, in accordance with embodiments of the invention.
Figure 7B:
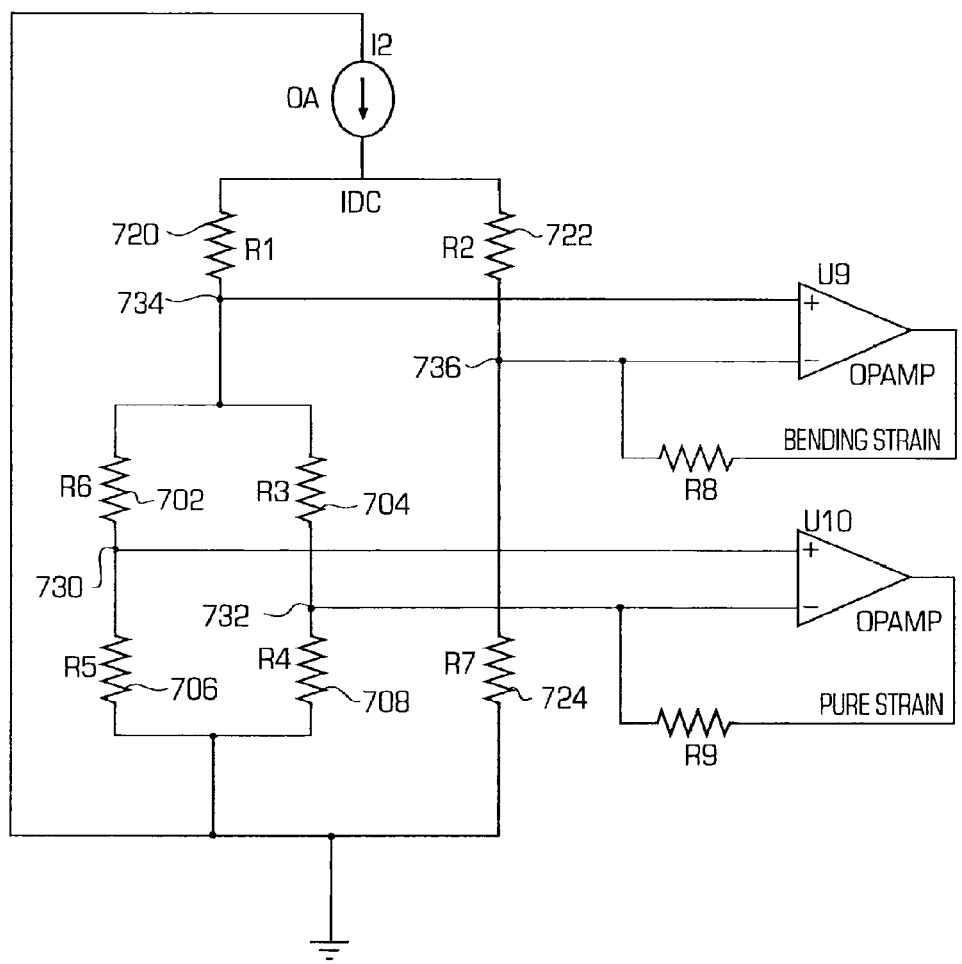

It should also be noted that the laying of traces such as the aluminum traces described in FIG. 4, as well as the fabricating and positioning of traces 516 in tape layers, are known. Accordingly, they can be employed to electrically interconnect sensing elements within the sensor apparatus 504 in any desired manner. FIGS. 7A-7B respectively illustrate a sensor configuration and corresponding electrical circuit for use in analyzing signals from a sensor apparatus, in accordance with an embodiment of the invention. In this configuration, a support toroid 700 supports piezoresistors 702-708, distributed as described above. The piezoresistors 702-708 are fabricated directly from the substrate material of the toroid 700, according to the processes described in FIGS. 4A-4Q. Aluminum traces 710 each extend to appropriate ones of the contact pads 508 (not shown), so that the resistance of each piezoresistor 702-708 can be measured. Reference resistors 720-724 are also fabricated in the bulk material of the sensor apparatus 504, and provide reference resistances for temperature compensation. The fabrication of the reference resistors 720-724, the aluminum traces that connect them to other contact pads 508, and the fabrication of the toroid 700 are described in FIGS. 4A-4Q.

In operation, the entire sensor apparatus shown in FIG. 7A is attached to a body as described above. Strain undergone by the body is transmitted to the support points 502 and, because the support points 502 are in mechanical contact with the support toroid 700, directly to the toroid 700. As described in FIGS. 1-2, the piezoresistors 702-708 react differently (i.e., change their resistances differently) depending on the type of strain they undergo. Such different reactions can be detected (and differentiated) by a circuit such as that shown in FIG. 7B, which illustrates one way in which the piezoresistors 702-708 can be electrically interconnected. Here, pairs of the piezoresistors 702-708 are electrically connected (either by connecting appropriate traces 710, contact pads 508, or corresponding electrical traces 516) in series, and each "series-pair" is connected in parallel. More specifically, piezoresistors 702 and 706 can be connected as one series-pair, and piezoresistors 704 and 708 are connected as another series-pair. These two series-pairs are connected in electrical parallel as shown.

As described above in connection with FIG. 1, each of the piezoresistors 702-708 will alter their resistances in accordance with a perceived strain. When connected in this configuration, one of skill in the art will observe that measuring the voltage difference between the two points 730, 732 will indicate the strain mode. More specifically, if all four piezoresistors 702-708 have changed their resistance uniformly, no voltage difference will be perceived, which indicates a pure bending condition. The magnitude of the strain measured in this instance can be determined by measuring the voltage difference between points 734 and 736. An axial strain condition is indicated when two piezoresistors that are diagonally opposite in FIG. 7B increase their resistance, while the other two decrease their resistance. This manifests itself as a voltage difference between points 730 and 732, the magnitude of which also indicates the magnitude of the strain. Accordingly, the piezoresistor configuration of FIG. 7A, when electrically connected as shown in FIG. 7B, allows for the detection of multiple strain modes with a single, low-profile micro-sensor apparatus.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, other sensing elements besides piezoresistors can be fabricated and employed. Also, the invention is not limited to support structures having ringlike or toroidal configurations, but rather simply discloses the fabrication of any microfabricated or MEMS support structure. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of fabricating a strain sensing apparatus, comprising:
    receiving a substrate having an upper surface and a lower surface;
    fabricating a plurality of strain sensing elements upon the substrate and proximate to the upper surface;
    etching material from the upper surface of the substrate so as to fabricate a sensor support structure configured to support the plurality of strain sensing elements thereon; and
    removing material from the lower surface of the substrate so as to further expose the sensor support structure;
    wherein the plurality of strain sensing elements further includes a first set of piezoresistive strain sensors and a second set of piezoresistive strain sensors, the method further comprising:
    connecting two of the first set of piezoresistive strain sensors in electrical series;
    connecting the two of the first set of piezoresistive strain sensors in electrical parallel so as to facilitate the detection of a strain; and
    electrically connecting the second set of piezoresistive strain sensors to the twos of the first set of piezoresistive strain sensors that are connected in electrical parallel, so as to facilitate a temperature compensation of the first set of piezoresistive strain sensors.

2. The method of claim 1 further comprising mounting the substrate upon a carrier so as to facilitate the coupling of the plurality of strain sensing elements to a body.

3. The method of claim 2 further comprising mounting a rigid enclosure upon the carrier so as to at least partially surround the plurality of strain sensing elements and the substrate.

4. The method of claim 1 wherein the fabricating further comprises fabricating a plurality of piezoresistors within the sensor support structure.

5. The method of claim 1 wherein the deformable substrate has an upper surface and an opposite lower surface, wherein the lower surface is configured to be coupled to the body, and wherein the strain sensing element is generally located proximate to the upper surface so as to generate a first response to a bending strain of the body, and to generate a second response to an axial strain of the body.

6. The method of claim 1 wherein the strain sensing element is located within the deformable substrate, the deformable substrate having a thickness generally less than approximately 200 micrometers.

7. The method of claim 1 wherein the deformable substrate has a thickness generally less than approximately 100 micrometers.

8. The method of claim 1 wherein the strain sensing element is a piezoresistive strain sensing element fabricated from the deformable substrate.

9. The method of claim 1 wherein the deformable substrate has a generally arcuate portion, the strain sensing element located along the generally arcuate portion.

10. The method of claim 1 wherein the deformable structure has an upper surface, an opposite lower surface configured to be coupled to the body, and a generally toroidal shape with an inner circumference and an outer circumference; wherein a first strain sensing element is located along a first portion of the toroidal shape and proximate to the inner circumference, and a second strain sensing element is located along the first portion and proximate to the outer circumference; wherein a third strain sensing element is located along a second portion of the toroidal shape and proximate to the inner circumference, and a fourth strain sensing element is located along the second portion and proximate to the outer circumference; and wherein the first portion is generally opposite to the second portion along the toroidal shape.

11. The method of claim 1 wherein at least one additional strain sensing element is configured to facilitate a temperature compensation of the first, second, third, and fourth strain sensing elements.

12. The method of claim 1 wherein a rigid enclosure at least partially surrounding the deformable substrate and the strain sensing element, so as to facilitate the protection of the deformable substrate and the strain sensing element against damage.

13. The method of claim 1 wherein the plurality of sensing elements is a plurality of piezoresistors configured so as to generate a first response to a bending strain of the body, and to generate a second response to an axial strain of the body.

14. The method of claim 1 wherein the flexible structure has a generally toroidal shape with an inner circumference and an outer circumference; wherein a first piezoresistor is located along a first portion of the toroidal shape and proximate to the inner circumference, and a second piezoresistor is located along the first portion and proximate to the outer circumference; wherein a third piezoresistor is located along a second portion of the toroidal shape and proximate to the inner circumference, and a fourth piezoresistor is located along the second portion and proximate to the outer circumference; wherein the first portion is generally opposite to the second portion along the toroidal shape.

15. The method of claim 1 wherein first and second piezoresistors are connected in electrical series so as to form a first electrical series connection, third and fourth piezoresistors are connected in electrical series so as to form a second electrical series connection, and the first and second electrical series connections are connected in electrical parallel so as to form an electrical parallel connection.

16. The method of claim 1 wherein the plurality of piezoresistors further comprises first, second, and third reference piezoresistors, wherein the electrical parallel connection is connected in electrical series with the first reference piezoresistor so as to form a first reference connection, wherein the second and third reference piezoresistors are connected in electrical series so as to form a second reference connection, and wherein the first and second reference connections are connected in electrical parallel.

17. The method of claim 1 wherein the flexible substrate has a thickness generally less than approximately 200 micrometers.

18. The method of claim 1 wherein the flexible substrate has a thickness generally less than approximately 100 micrometers.

19. The method of claim 1 further comprising a rigid enclosure at least partially surrounding the deformable substrate and the strain sensing element, so as to facilitate the protection of the deformable substrate and the strain sensing element against damage.

* * * * *